United States Patent [19]

Heron et al.

[11] Patent Number: 4,836,498
[45] Date of Patent: Jun. 6, 1989

[54] LIQUID FLOW CONTROL ASSEMBLY

[76] Inventors: Roger A. Heron, 30 Church Lane, Stagsden, Bedfordshire MK43 8SH; Martin L. Hughes, 6 Milton Drive, Newport Pagnell, Buckinghamshire; Ian Hansford, 23 Longfellow Drive, Newport Pagnell, Buckinghamshire MK16 8PQ, all of England

[21] Appl. No.: 193,178

[22] Filed: May 9, 1988

Related U.S. Application Data

[63] Continuation of Ser. No. 834,126, Feb. 26, 1986, abandoned, which is a continuation of Ser. No. 561,597, filed as PCT GB83/00103 on Apr. 7, 1983, published as WO83/03655 on Oct. 27, 1983, abandoned

[30] Foreign Application Priority Data

Apr. 7, 1983 [GB] United Kingdom ............... 8210289

[51] Int. Cl.⁴ .................... F16K 1/08; F16K 47/00
[52] U.S. Cl. .................... 251/126; 251/127; 251/333
[58] Field of Search ............ 251/126, 127, 333

[56] References Cited

U.S. PATENT DOCUMENTS

| 342,267 | 5/1886 | Richardson | 251/127 X |
|---|---|---|---|
| 675,513 | 6/1901 | Kaplinger | 251/127 X |
| 1,506,546 | 6/1922 | Oleson | |
| 1,919,232 | 7/1933 | Lee | 251/127 X |
| 2,114,858 | 4/1938 | Rosch | 251/333 X |
| 2,187,787 | 5/1938 | Kinzie | |
| 3,469,591 | 9/1969 | Odendahl | 251/126 X |

FOREIGN PATENT DOCUMENTS

| 440441 | 12/1966 | Australia . |
| 1098772 | 2/1961 | Fed. Rep. of Germany . |
| 1550555 | 10/1973 | Fed. Rep. of Germany . |
| 2351715 | 10/1973 | Fed. Rep. of Germany . |
| 2730431 | 7/1977 | Fed. Rep. of Germany . |
| 1550009 | 11/1968 | France . |

OTHER PUBLICATIONS

J. Blackburn et al., *Fluid Power Control,* pp. 296–313 (New York, 1960).

*Primary Examiner*—Arnold Rosenthal
*Attorney, Agent, or Firm*—Wegner & Bretschneider

[57] ABSTRACT

Liquid flow through a passage (9) in a body member (7) is controlled by a relatively movable poppet valve member (8). A frusto-conical first guide surface (11) on the poppet valve (8) merges smoothly with a second guide surface (12 and 13) which, in cross-section, has part-circulr portion (12) and an outlet end (13). Liquid passing through an aperture (10) between the body member (7) and the poppet valve member (8) flows along the first guide surface (11) and the second guide surface (12 and 13) and adopts a toroidal vortex flow pattern and this controls the collapse of those bubbles which form as a result of cavitation so as to diminish audible and inaudible vibrations.

11 Claims, 3 Drawing Sheets

FLUID FLOW

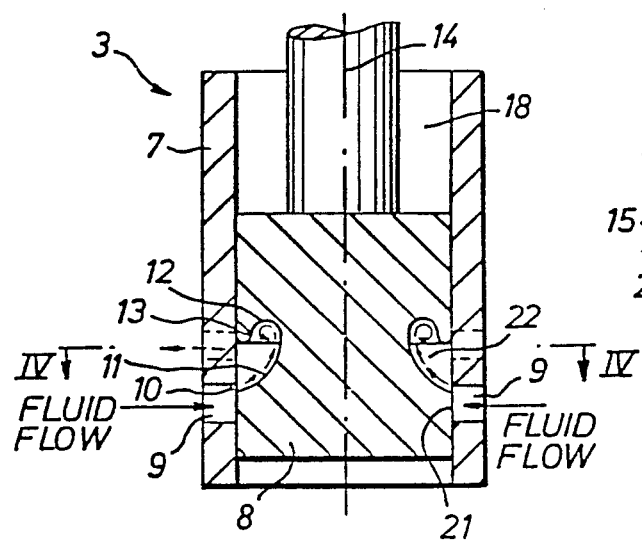
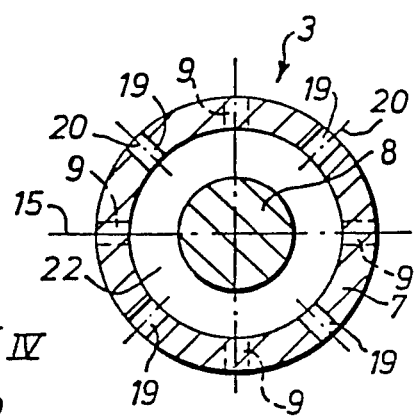
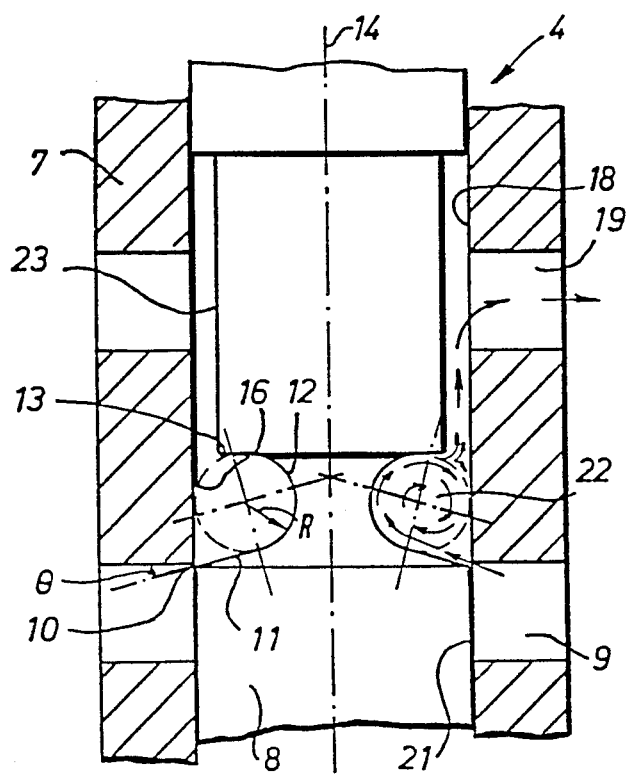

LIQUID FLOW CONTROL ASSEMBLY

This application is a continuation of U.S. application Ser. No. 834,126, filed Feb. 26, 1986, now abandoned, which is a continuation of Ser. No. 561,597, filed as PCT GB83/00103 on Apr. 7, 1983, published as WO83/03655 on Oct. 27, 1983, now abandoned.

TECHNICAL FIELD

The invention relates to a device for the flow controlling elements of valves and other similar devices employed in hydraulic systems, so constructed as to reduce the noise, mechanical vibration and pressure fluctuation generated within such devices.

BACKGROUND ART

It is known to provide a liquid flow control assembly in which a body member, providing at least one passage, and a closure member are relatively movable between a first condition in which the closure member prevents flow of liquid through the or each passage and a second condition in which the body member and the closure member define at least one aperture for the flow of liquid between the body member and the closure member.

Thus, many devices used within a hydraulic system employ means whereby the pressure or flow rates of the system working fluid is controlled by passing the working fluid through a narrow aperture. The control of fluid pressure or flow may form part or the whole of the function of the device.

Commonly, the aperture is formed by an annular gap between a cone and a circular orifice concentric with the axis of the cone and of diameter less than the base diameter of the cone. Variation in the flow area available through the annular gap is commonly achieved by movement of the cone and orifice relative to one another along the axis of the cone. Such an arrangement is often referred to as a "cone and seat", "plug and seat", "poppet valve" "globe valve" assembly.

Alternatively, the narrow aperture hereinbefore mentioned may be formed by the circumferential gap between the end of a cylinder and openings formed in a close fitting sleeve around the cylinder. Variation in the flow area available through the openings in the sleeve may be achieved by relative movement of the sleeve and cylinder along the cylinder axis, such that the cylinder covers a greater or smaller part of the sleeve openings. Such an arrangement is commonly referred to as a "spool and sleeve valve" assembly.

As a further alternative, the narrow aperture hereinbefore mentioned may be formed by the crescent shaped gap between a circular conduit and a circular plate partially blocking off this conduit. Variation in the flow area may be achieved by movement of the circular plate along a line perpendicular to the axis of the conduit. Such an arrangement is commonly referred to as a "gate valve" assembly.

It is known feature of "poppet valve", "spool and sleeve valve" and "gate valve" assemblies that high fluid velocities can occur in the region of the aperture between the body member and the closure member comprising the controlling elements and that this results in low local pressures in the fluid after it has passed through the aperture. Gas and vapour bubbles commonly form in this region, giving rise to cavitation which is frequently in the form of a "plume" of cavitation bubbles emerging from the assembly.

The presence of cavitation within a hydraulic device may result in noise, mechanical vibration, fluid pressure fluctuations, and physical damage. It is therefore desirable that the shapes of the pressure or flow controlling elements within any hydraulic device be such as to reduce as far as possible the tendency for cavitation to occur and to control and contain any cavitation "plume" that may form. It is also desirable that the flow or pressure controlling elements of a hydraulic device be so formed as to reduce the tendency for "instability", or low frequency oscillation, of the controlling elements.

DISCLOSURE OF THE INVENTION

It is intended, by means of the invention, to provided a liquid flow control assembly with which it is possible to control and contain any cavitation bubbles formed at a body member and a closure member which are movable into and out of a first condition in which liquid flow is prevented, thereby reducing the noise output from, and potential cavitation damage to, the assembly.

This is achieved by providing a first guide surface downstream of an aperture defined by the first and second parts, when in a second condition, for liquid flow therebetween; and a second guide surface for directing liquid flowing along the first guide surface into a vortex flow path.

The second guide surface is so shaped as to cause a vortex to form in the fluid emerging from the aperture and the process by which the reduction in cavitation noise is effected is thought to be by centrifugal action in the rapidly spinning vortex which causes cavitation bubbles to migrate away from the outside solid boundary of the vortex (thereby reducing structural noise and damage) and also tends to promote continuous accumulation and merging together of cavitation bubbles rather than discrete bubble collapse, thereby reducing both the level and frequency of the fluid borne noise generated. The shape and position of the second guide surface is such that the forces imposed upon it by the fluid emerging from the aperture tend to counteract the flow forces acting on the first and second parts, thereby reducing the tendency for low frequency instability.

It is a specific characteristic of the invention that control over fluid pressure or flow, and the loss of fluid energy associated with this control, is caused by the first and second parts and the aperture between them, not by the fluid vortex formed in the emerging fluid.

Conveniently, the second guide surface for generating the fluid vortex may be provided by shaping one or other of the body member and closure member to a form which takes as design parameters the velocity and vapour pressure of the liquid emerging from the aperture between the body member and the closure member.

The first and second guide surfaces preferably merge smoothly with each other and the second guide surface is preferably concave and, in each section which contains the axis of the body member and passes perpendicularly through the second guide surface, has a part-circular portion and an outlet end.

Where the first guide surface forms part of the conical surface of a poppet valve then, in any radial section containing the axis of the passage with which the poppet valve cooperates, the first guide surface extends tangentially of the second guide surface. In all other cases, where the first guide surface is concave and, in each section which contains the axis of the body member and the axis of the passage and passes through the second guide surface, the first and second guide surfaces merge at a point of common tangency.

Where the closure member is a poppet valve member, the first guide surface may be formed on the poppet valve member as a surface of revolution which extends divergently downstream of the aperture. An extension of this surface may project convergently inwards so as to lie within the liquid conduit.

Alternatively, the first guide surface may be provided on the body member which provides the passage. In either case, the second guide surface may be formed on one of the two members other than the one on which the first guide surface is formed and this second guide surface may face and conform to the first guide surface.

The second guide surface may be provided on guide means which surround the first guide surface. These guide means may be formed integral with whichever of the first and second parts on which the first guide surface is formed or may be formed on one or more detachable parts.

In another embodiment of the invention, the body member, such as a sleeve, has a bore; the or each passage is provided by an inlet port each of which extends on a radial axis perpendicular to the axis of the bore and opens into the bore; at least one outlet port is formed in the body member, on a radial axis perpendicular to the axis of the bore, and opens into the bore; the closure member is a spool which is reciprocable within the bore; the spool has a cylindrical land which blocks the inlet port when the assembly is in its first condition and clears at least part of the inlet port when the assembly is in its second condition; a circumferential groove formed in said spool, adjacent the cylindrical land, overlaps at least part of said inlet port and at least part of said outlet port when the assembly is in its second condition; the first guide surface is a surface of revolution extending from said cylindrical land and forms a first part of the cylindrical groove; and the second guide surface is a surface of revolution extending from said first guide surface and forms a second part of the cylindrical groove.

Where the spaced radial axes lie in two axially spaced radial planes, additional inlet and outlet ports may be provided on axes lying in said planes.

In a further embodiment, the body member is a gate valve body providing a passage and having upstream and downstream ends and an integral sealing surface; the closure member is a gate valve member having a sealing edge and is reciprocable on an axis perpendicular to the axis of the gate valve body between a position in which the sealing edges engages the sealing surface, when the assembly is in its first, i.e. closed, condition, and a position in which the sealing edge is spaced from the sealing surface, when the assembly is in its second, i.e. open, condition; a formation is provided within the gate valve body on the downstream side of the sealing surface, on the gate valve body, adjacent that part of the gate valve body to which the gate valve member moves when moving into the position the gate valve member occupies when the sealing edge engages the sealing surface and the assembly is in its first condition; the first guide surface is formed on said formation and extends from the sealing surface; and the second guide surface is formed on said formation and extends from said first guide surface.

Six embodiments of the invention are hereinafter described, by way of example, with reference to the accompanying drawings.

BRIEF DESCRIPTION OF THE DRAWINGS

FIG. 3 is a schematic sectional side elevation of a spool and sleeve valve assembly, in accordance with the invention;

FIG. 4 is an axial section of the assembly shown in FIG. 3, taken across the Section IV—IV;

FIG. 5 is a schematic sectional side elevation of a practical embodiment of the spool and sleeve valve assembly shown in FIGS. 3 and 4;

MODES FOR CARRYING OUT THE INVENTION

Figure 1:
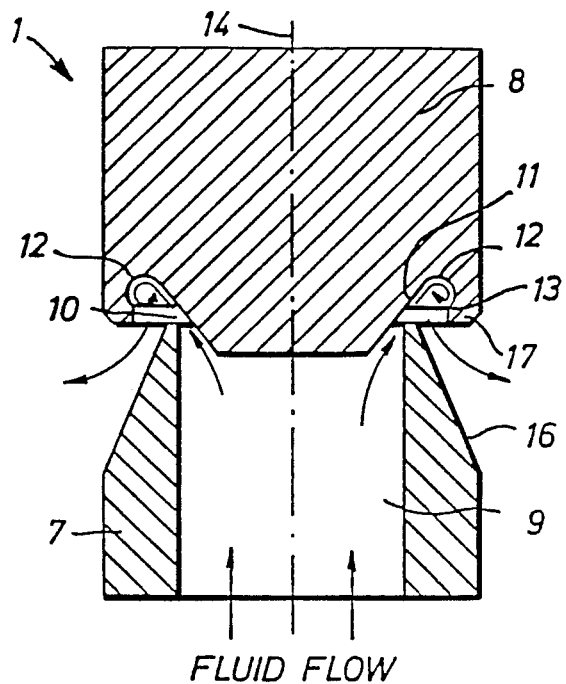
FIG. 1 is a schematic sectional side elevation of a poppet valve assembly in accordance with the invention.

As shown in FIG. 1, a poppet valve assembly 1 comprises a tubular body member 7, providing a liquid passage 9, and a closure member in the form of a poppet valve member 8. The poppet valve member 8 and the tubular body member 7 are relatively movable along the axis 14 of the liquid passage 9 to block the liquid passage 9 or to vary the size of the annular aperture 10 between the tubular body member 7 and the poppet valve member 8.

As shown, the poppet valve member 8 has a frusto-conical surface 11 part of which extends divergently away from the aperture 10 and part of which projects convergently into the liquid passage 9.

As shown in the sectional view illustrated in FIG. 1, the first guide surface 11 is tangential to a second guide surface 12 and 13 which has a part-circular portion 12 and an outlet end 13 directed towards a third guide surface 16 formed on the body member 7.

Thus, when the aperture 10 is narrow enough to promote cavitation of the liquid flowing through the aperture 10, this liquid flows along the first guide surface 11, then around the second guide surface 12 and 13, and thereafter follows a toroidal vortex flow pattern before flowing away from the assembly. This permits the collapse of any bubbles which are formed in such a way that there is a diminution in audible and inaudible vibration.

As shown, the second guide surface 12 and 13 is formed on guide means 17 which are integral with the poppet valve member 8. However, these guide means 17 may be in the form of one or more separable parts and, moreover, where the first guide surface 11 is provided on the tubular body member 7, the guide means providing the second guide surface 12 and 13 may be formed integral with or attached to the tubular body member 7.

When the tubular body member 7 and the poppet valve member 8 are sufficiently separated to ensure that there is no cavitation in the liquid flowing through the aperture 10, only part of this liquid flows along the first guide surface 11 and, from there, around the second guide surface 12 and 13. The remainder of the liquid is unimpeded and escapes freely from the assembly.

Figure 2:
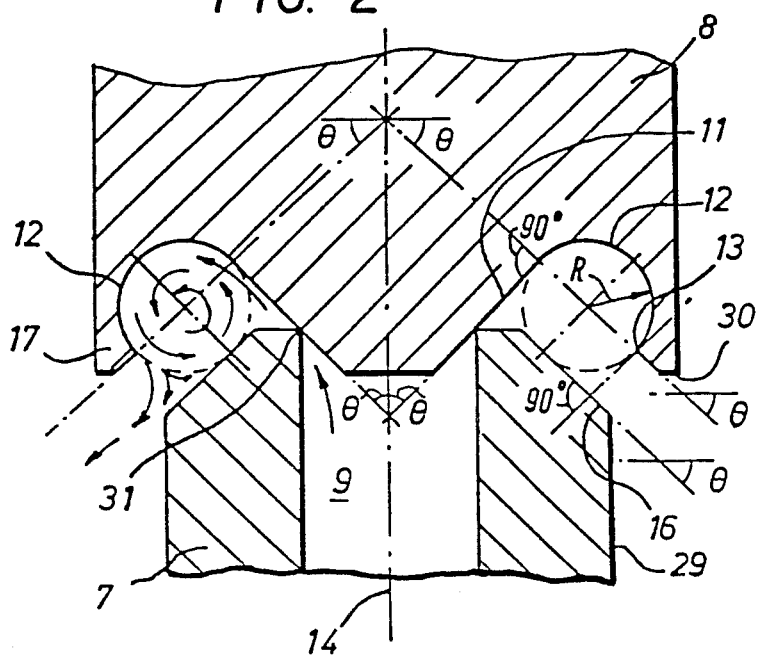
FIG. 2 is a schematic sectional side elevation of a practical embodiment of the poppet valve assembly shown in FIG. 1.

In the practical embodiment of the poppey valve assembly 2, shown in FIG. 2, the second guide surface 12 and 13 is semi-circular in cross-section and the third guide surface 16 extends perpendicular to the first guide surface 11, and therefore perpendicular to the outlet end 13 of the second guide surface 12 and 13, and is tangential to an imaginary circle conforming to the second guide surface 12 and 13. Surfaces 29 and 30 extend divergently away from the third guide surface 16 to facilitate flow of liquid from the the passage 9.

In modifications of the embodiment shown in FIG. 2, the second guide surface 12 and 13 includes a part-circular portion which leads from the first guide surface 11 and extends through less than 180°, for high flow rate applications. In this case, the third guide surface 16 extends perpendicular to the outlet end 13 of the second guide surface 12 and 13 and so is no longer perpendicular to the first guide surface 11.

The edge 31 of the body member 7 which cooperates with the closure member 8 to define the aperture 10 may be bevelled to provide a small flat surface.

In the spool and sleeve valve assembly 3 shown in FIGS. 3 and 4, a body member in the form of a sleeve 7 is formed with a bore 18, four inlet ports 9, constituting liquid passages, and four outlet ports 19. The inlet ports 9 and the outlet ports 19 lie, respectively, on radial axes 15 and 20 respectively defining planes which extend perpendicular to the axis 14 of the sleeve 7 and which are spaced apart along this axis 7. However, these ports 9 and 19 need not be circular in cross-section and may comprise circumferentially extending slots.

The closure member is in the form of a spool 8 which is formed with a cylindrical land 21, at one end, and a circumferential groove 22, adjacent the cylindrical land 21.

The spool 8 is reciprocable along the axis 14 of the sleeve 7 between a position in which the cylindrical land 21 blocks the inlet ports 9 and a position in which the groove 22 overlaps both the inlet ports 9 and the outlet ports 19 so as to permit liquid to flow into the groove 22, through the inlet ports 9, and out of the groove 22, through the outlet ports 19.

As shown, a first guide surface 11, in the form of a surface of revolution, extends from the cylindrical land 21 and forms a first part of the circumferential groove 22 and a second guide surface 12 and 13, in the form of a surface of revolution, extends from the first guide surface 11 and forms a second part of the circumferential groove 22. As shown, in the sectional elevation illustrated in FIG. 3, the first guide surface 11 and the second guide surface 12 and 13 are concave and the second guide surface 12 and 13 is part-circular.

Thus, when the spool 8 is moved to a position in which the groove 22 overlaps each inlet port 9 to provide an aperture 10 which is sufficiently small to cause liquid flowing through the inlet port 9 into the circumferential groove 22 to cavitate, the collapse of cavitation bubbles which are formed is effected with a diminution in audible and inaudible vibration by causing the liquid to flow along the first guide surface 11 and the second guide surface 12 and 13, which meet at a point of common tangency, so as to adopt a toroidal vortex flow pattern before discharging through the outlet ports 19.

When each aperture 10 is sufficiently large to ensure that there is no cavitation, only part of the liquid entering the circumferential groove 22 through the inlet ports 9 flows around the first guide surface 11 and the second guide surface 12 and 13. The remainder of this liquid flows unimpeded through the circumferential groove 22 and out through the outlet ports 19.

In the practical embodiment of the spool valve assembly 4, shown in FIG. 5, the groove 22 has first and second parts formed, respectively, by the first guide surface 11 and by the second guide surface 12 and 13 as well as a third part formed by the surface 23 of a necked-down portion of the spool 8. First guide surface 11 is inclined at an angle $\theta$ to a plane perpendicular to the axis 14 of the bore 18 and, in accordance with established spool valve theory, $\theta$ equals 69°.

In each axial cross-section, the second guide surface 12 and 13 has a part-circular portion 12, extending through less than 180°, and a radially extending outlet end 13 which is tangential to the part-circular portion 12 and perpendicular to the third guide surface 16, forming part of the bore 18 of the sleeve 7 which is tangential to an imaginary circle conforming to the part-circular portion 12 of the guide surface 12 and 13.

Figure 6:
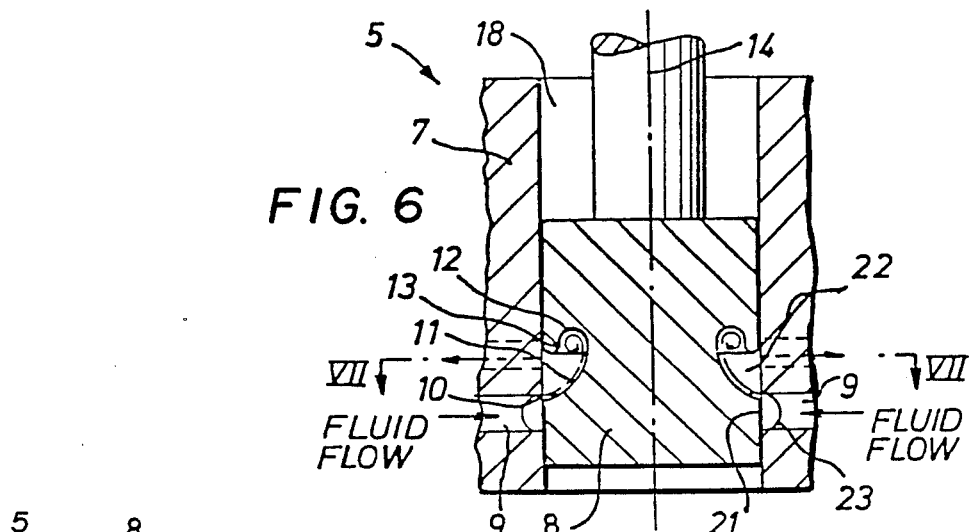
FIG. 6 is a schematic sectional side elevation of a valve assembly similar to the construction illustrated in FIG. 3 and 4.
Figure 7:
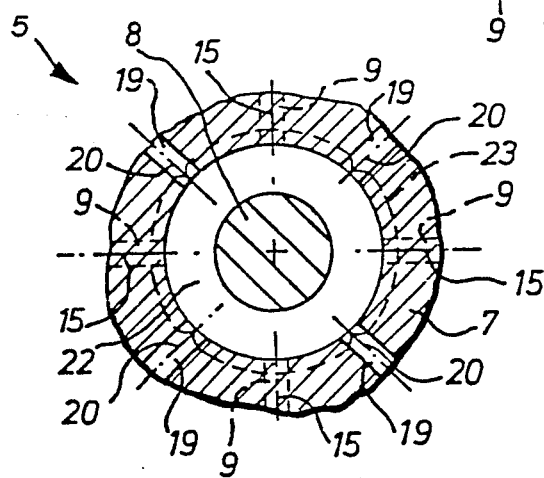
FIG. 7 is an axial section of the assembly shown in FIG. 6, taken across the section VII—VII.

The spool valve assembly 5 shown in FIGS. 6 and 7 is similar to the spool and sleeve valve assemblies 3 and 4 shown, respectively, in FIGS. 3 and 4 and in FIG. 5. However, in this case the bore 18 is formed in a body member 7 which is not a sleeve. Moreover, the inlet ports 9 communicate with a circumferential groove 23 formed in the internal surface of the bore 18. In this case the aperture 10 is cylindrical in shape.

It is to be understood that the outlet ports 19 may also communicate with a circumferential groove in the internal surface of the bore 18. Similarly, it is also to be understood that the assemblies 3 and 4 illustrated in FIGS. 3 and 4 and in FIG. 5 may also be modified by the provision of a circumferential groove in the internal surface of the bore 18 for communication with the inlet ports 9 and/or the outlet ports 19.

Figure 8:
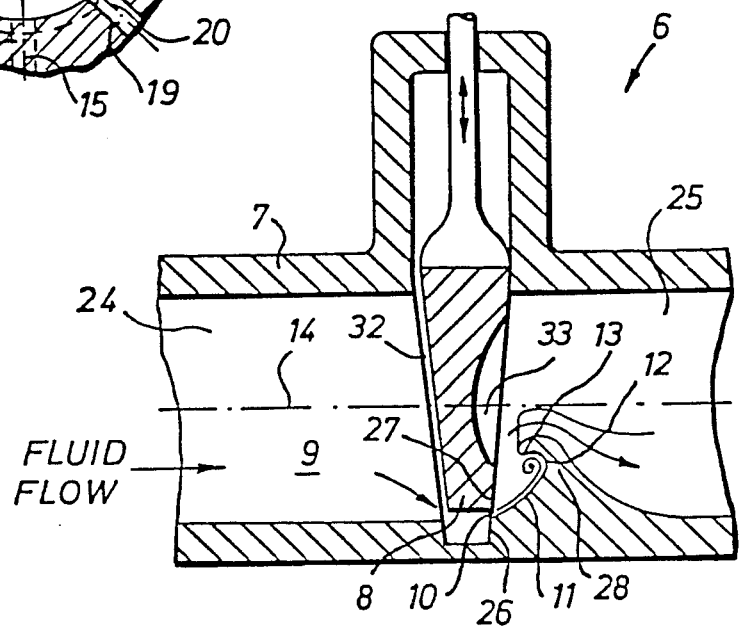
FIG. 8 is a schematic sectional side elevation of a gate valve assembly in accordance with the invention.

In the gate valve assembly 6, shown in FIG. 8, a body member in the form of a gate valve body 8 has upstream and downstream ends 24 and 25 and a liquid passage 9 extending along an axis 14. A closure member in the form of a gate valve member 9 is reciprocable perpendicular to the axis 14 in a groove 32 formed in the inner surface of the gate valve body 7. The groove 32 has an internal sealing surface 26 and a sealing edge 27 on the gate valve body 9 engages the sealing surface 26 to prevent the flow of liquid along the liquid passage 9 when the gate valve member 8 is in its closed position and the assembly 6 is in its first condition.

To control cavitation when the gate valve member 8 is moved away from its closed position, to form a crescent shaped aperture 10 between the sealing surface 26 and the sealing edge 27, a formation 28 is provided on the gate valve body 7, adjacent that part of the gate valve body 7 to which the gate valve member 8 moves when moving into the position the gate valve member 8 occupies when the sealing edge 27 engages the sealing surface 26 and the assembly 6 is in its first condition.

As shown in the sectional elevation illustrated in FIG. 8, a first guide surface 11 is formed on the formation 28 and extends from the sealing surface 26 and this first guide surface 11 merges smoothly with a second guide surface 12 and 13, which has part circular portion 12, at a point of common tangency.

Thus, when the gate valve member 8 is moved out of its closed position, the collapse of cavitation bubbles which form is effected with a diminution in audible and inaudible vibration as a result of the fact that the liquid flows around the first guide surface 11 and the second guide surface 12 and 13 so as to adopt a vortex flow pattern before flowing over the formation 28 and then along the passage 9. To facilitate this flow of liquid over the formation 28, a rebate 33 is formed in the downstream side of the gate valve member 8.

When the gate valve member 8 is moved sufficiently from its closed position to ensure that there is no cavitation in the liquid flowing through the aperture 16, only part of this liquid flows along the first guide surface 11 and the second guide surface 12 and 13; the remainder flows unimpeded over the formation 28.

In each of the embodiments, the exact form of the first guide surface 11 and the second guide surface 12 and 13 and the members which provide these guide surfaces will vary with the size and function of the assembly and, as described with reference to assembly 1, illustrated in FIG. 1, the means providing the first and second guide surfaces may be formed integral with or separable from the body member and closure member of the assembly.

We claim:

1. A liquid flow control assembly for controlling the flow of liquid between a body member and a closure member in which a body member, providing at least one passage, and a closure member are relatively movable between a first position in which complementary surfaces on said body member and said closure member engage to prevent flow of liquid through said passage and a second position in which the complementary surfaces on said body member and said closure member separate to define at least one aperture, said body member having an axis, wherein said complementary surface on said closure member acts as a first guide surface and extends downstream from said aperture and circumferentially at least partly around the axis of said body member, the outline of said first guide surface being non-convex in each cross-section containing the axis of said body member or the axis of said closure member and the axis of said passage provided by said body member and wherein there are no intervening surfaces between said aperture and said first guide surface such that said liquid uninterruptedly flows from said aperture to said first guide surface, and further comprising a second guide surface which abuts said first guide surface and which directs liquid from a direction of flow along said first guide surface into a vortex flow path and which is located on the same member as said guide surface, wherein said first guide surface and said second guide surface are tangent at their point of abutment, said first and second guide surfaces forming a continuous, non-convex surface.

2. An assembly according to claim 1, in which said first guide surface and said second guide surface merge smoothly with each other.

3. An assembly according to claim 1 in which said first guide surface is a surface of revolution.

4. An assembly according to claim 2, in which said second guide surface extends circumferentially at least partly around the axis of said body member, and, in each cross-section containing the axis of said body member, and the axis of said passage provided by said body member the outline of said second guide surface is concave and includes at least a part-circular portion which extends from the outline of said first guide surface.

5. An assembly according to claim 4, in which said second guide surface is a surface of revolution.

6. An assembly according to claim 3 in which a third guide surface is spaced from said second guide surface and said second guide surface has an outlet end directed perpendicularly towards said third guide surface.

7. An assembly according to claim 3 in which in each cross-section containing the axis of said body member and the axis of said passage and passing perpendicularly through said first guide surface and said second guide surface, the outline of said first guide surface extends rectilinearly from and is tangential to the outline of said second guide surface.

8. An assembly according to claim 7, in which the closure member is a poppet valve member and said first guide surface is frusto-conical in shape.

9. An assembly according to claim 8, in which in each cross-section containing the axis of said body member and passage said second guide surface comprises a semicircular portion with an outlet end, further comprising a third guide surface extending perpendicularly to said first guide surface and, in said first position of the assembly, tangentially to an imaginary circle conforming to the semi-circular portion of said second guide surface.

10. An assembly according to claim 7 in which said closure member is a poppet valve member and said first guide surface is a surface of revolution extending divergently from said aperture.

11. An assembly according to claim 8 in which said first guide surface is provided on said poppet valve member and said second guide surface is provided on a guide means surrounding said first guide surface.

* * * * *